United States Patent [19]
Suzuki et al.

[11] Patent Number: 5,691,583
[45] Date of Patent: Nov. 25, 1997

[54] STEPPING MOTOR WITH INTERNAL POWER CONNECTIONS

[75] Inventors: Yuzuru Suzuki; Hideki Akagawa, both of Shizuoka-ken, Japan

[73] Assignee: Minebea Kabushiki-Kaisha, Nagano-ken, Japan

[21] Appl. No.: 640,385

[22] Filed: Apr. 30, 1996

[30] Foreign Application Priority Data

Aug. 31, 1995 [JP] Japan ................... 7-246734

[51] Int. Cl.⁶ ................................... H02K 15/00
[52] U.S. Cl. .................. 310/49 R; 310/164; 310/154; 336/192
[58] Field of Search ................. 310/49 R, 164, 310/154; 336/192, 198, 208

[56] References Cited

U.S. PATENT DOCUMENTS

| | | | |
|---|---|---|---|
| 3,731,245 | 5/1973 | Roslin | 336/192 |
| 5,121,017 | 6/1992 | Yamamoto et al. | 310/49 R |
| 5,254,892 | 10/1993 | Bosman et al. | 310/49 R |
| 5,331,237 | 7/1994 | Ichimura | 310/44 |
| 5,410,200 | 4/1995 | Sakamoto et al. | 310/49 R |

*Primary Examiner*—Steven L. Stephan
*Assistant Examiner*—Timothy A. Williams
*Attorney, Agent, or Firm*—Lowe, Price, LeBlanc & Becker

[57] ABSTRACT

In the motor: rotating shaft 5 is mounted in casing 1; a rotor yoke 7 has its top closed with plate 7a and its bottom opened; the plate 7a with a center hole is fitted on the shaft 5; the rotor yoke 7 has a permanent magnet 6 in its inner surface; stator 8 constructed of coil 11 and stator yoke 12, 13 and fixed to the casing 1 surrounds the shaft 5; bobbin 10 for the coil 11 having its upper and lower ends opened has outer flange 14, 15 in its opposite opened-ends; the stator yoke 12, 13 surround the coil 10; the bobbin 10 has axial ridge 16a in its inner surface; through-holes 17a, 17b, 18a, 18b of the ridge 6a extend along the length of the ridge 16a; feeding members 20, 22 pass through the through-hole 17a, 17b, 18a, 18b, are connected with lead wires 21 extending outward from the coils 10, and have their ends extended outward from the casing 1 to form feeding terminals.

5 Claims, 9 Drawing Sheets

STEPPING MOTOR WITH INTERNAL POWER CONNECTIONS

BACKGROUND OF THE INVENTION

1. Field of the Invention

The present invention relates to an outer-rotor/claw-pole type stepping motor and a method for producing the same.

2. Description of the Prior Art

In a conventional outer-rotor/claw-pole type stepping motor, lead wires, which follow the windings of stator coils, are connected with power feeding terminals provided outside a casing of the motor. In assembly, the lead wires are passed through a slot between teeth of a stator yoke, then through a very narrow gap between the stator yoke and a rotor so as not to touch the rotor, and reach the feeding terminals of an outer peripheral surface of the casing.

As described above, in the conventional stepping motor having the above construction, when a stator and other components are assembled into the motor in fabrication, the lead wires must be passed through the above-mentioned very narrow gap so as not to touch the rotor. Consequently, such lead wires are very cumbersome in handling and installation, and require a skilled worker in assembly. In other words, in the conventional stepping motor, the lead wires have the disadvantage that they take too much time and labor in assembly.

There is another type of conventional stepping motor, in which the number of its stator tooth is reduced to facilitate the installation of the lead wires in assembly. However, such another conventional stepping motor with the thus reduced number of the stator tooth is too large in step angle caused by each step, and is therefore poor in angularly positioning accuracy.

SUMMARY OF THE INVENTION

It is an object of the present invention to provide a stepping motor having its lead wires extending from its coils connected with its power feeding terminals in an easy manner without reducing the number of its stator tooth, which enables the motor to keep its step angle to a small value, and, therefore to be improved in angularly positioning accuracy.

According to a first aspect of the present invention, the above object of the present invention is accomplished by providing:

In a stepping motor comprising, in combination:

(a) a rotating shaft rotatably mounted in a casing;
(b) a rotor yoke assuming a sleeve-like shape having its top portion closed with a top-plate portion and its bottom portion opened, the top-plate portion of the rotor yoke being provided with a center hole in which the rotating shaft is fixedly mounted, the rotor yoke being provided with a permanent magnet in its inner peripheral surface;
(c) an upper and a lower stator each of which is constructed of a coil and a stator yoke, and fixedly mounted in the casing to surround the rotating shaft, the coil having its conductor wound on a bobbin which assumes sleeve-like shape and having its upper and lower end portions opened, the bobbin being provided with an outer flange in its opposite opened-end portions, the stator yoke surrounding the coil;

the improvement wherein:

(d) the bobbin is provided with an axial ridge portion in its inner peripheral surface, the ridge portion extending in a longitudinal direction of the bobbin and being provided with a through-hole extending in parallel with the ridge portion; and
(e) a plurality of power feeding members pass through the through-hole of the bobbin and are connected with a plurality of lead wires which extend outward from the coils, the feeding members having their end portions extended outward from the casing to form a plurality of power feeding terminals.

According to a second aspect of the present invention, the above object of the present invention is accomplished by providing:

The stepping motor as set forth in the first aspect of the present invention, wherein:

a guide groove is provided in one of axially adjacent surfaces of adjacent ones of the outer flanges between the upper and the lower bobbin, extends from the ridge portion of the bobbin to an outer peripheral edge portion of the outer flange of the bobbin, and is provided with a radially-recessed portion in its outer peripheral portion; and the lead wires extending from the coils are passed through the radially-recessed portion of the guide groove and the remaining portion of the guide groove, and connected with the power feeding terminals.

According to a third aspect of the present invention, the above object of the present invention is accomplished by providing:

The stepping motor as set forth in the first aspect of the present invention, wherein:

the power feeding members are constructed of electrically conductive rod members.

According to a fourth aspect of the present invention, the above object of the present invention is accomplished by providing:

The stepping motor as set forth in the first aspect of the present invention, wherein:

the power feeding members are constructed of electrically conductive wire members.

According to a fifth aspect of the present invention, the above object of the present invention is accomplished by providing:

A method for producing a stepping motor, comprising, the steps of:

(a) using a pair of bobbins for stators, each of which bobbins is provided with a sleeve portion provided with an outer flange in each of its opposite open ends, is provided with an axial ridge portion in its inner peripheral surface, the ridge portion extending in a longitudinal direction of the bobbin and being provided with a through-hole extending in parallel with the ridge portion, and is further provided with a guide groove in one of opposite axial surfaces of the outer flanges sandwiched between the upper and the lower bobbin, the guide grove extending from the ridge portion of the bobbin to an outer peripheral edge of the outer flange of the bobbin and being provided with a radially-recessed portion in its outer peripheral portion;

(b) fabricating a stator coil by winding a series of overlapping wire on a sleeve portion of each of the upper and the lower bobbin;

(c) press-fitting each of a pair of first terminal rod members into the through-hole of the upper bobbin and each of a pair of second terminal rod members into the through-hole of the lower bobbin, each of the first rod members being slightly longer than the total axial length of the upper and the lower stators having been stacked together, each of the second rod member being slightly longer than the axial length of the lower stator;

(d) connecting a plurality of lead wires extending from electrically-conductive wires of the upper and the lower stator coil with the terminal rod members through the radially-recessed portion of the guide groove and the remaining portion of the guide groove formed in the outer flange of the bobbin;

(e) surrounding each of the upper and the lower stator coil with a stator yoke to form each of an upper and a lower stator;

(f) stacking the upper and the lower stator together in a condition in which the lower stator has the guide groove of its bobbin disposed in the uppermost position of the lower stator, the upper stator has the guide groove of its bobbin disposed in the lowermost position of the upper stator, and the terminal rod members having been press-fitted into the through-hole of the bobbin of the upper stator are inserted into the through-hole of the bobbin of the lower stator;

(g) press-fitting the upper and the lower stator having been stacked together onto a central axial sleeve portion of a casing of the stepping motor; and (h) press-fitting a central hole of a top plate portion of a rotor yoke onto a rotating shaft which is rotatably mounted in the central axial sleeve portion of the casing.

According to a sixth aspect of the present invention, the above object of the present invention is accomplished by providing:

A method for producing a stepping motor, comprising, the steps of:

(a) using a pair of bobbins for stators, each of which bobbins is provided with a sleeve portion provided with an outer flange in each of its opposite open ends, is provided with an axial ridge portion in its inner peripheral surface, the ridge portion extending in a longitudinal direction of the bobbin and being provided with a through-hole extending in parallel with the ridge portion, and is further provided with a guide groove in one of axially adjacent surfaces of adjacent ones of the outer flanges between the upper and the lower bobbin, the guide grove extending from the ridge portion of the bobbin to an outer peripheral edge of the outer flange of the bobbin and being provided with a radially-recessed portion in its outer peripheral portion;

(b) fabricating a stator coil by winding a series of overlapping wire on a sleeve portion of each of the upper and the lower bobbin;

(c) press-fitting each of a pair of first terminal rod members into the through-hole of the upper bobbin and each of a pair of second terminal rod members into the through-hole of the lower bobbin, each of the first and the second rod members being slightly longer than the total axial length of the upper and the lower stators having been stacked together;

(d) connecting a plurality of lead wires with the terminal rod members, the lead wires extending outward from electrically-conductive wires of the upper and the lower stator coil through the radially-recessed portion of the guide groove and the remaining portion of the guide groove formed in the outer flange of the bobbin;

(e) surrounding each of the upper and the lower stator coil with a stator yoke to form each of an upper and a lower stator;

(f) axially stacking the upper and the lower stator together in a condition in which the lower stator has the guide groove of its bobbin disposed in the uppermost position of the lower stator, the upper stator has the guide groove of its bobbin disposed in the lowermost position of the upper stator, the terminal rod members having been press-fitted into the through-hole of the bobbin of the upper stator are inserted into the through-hole of the bobbin of the lower stator, and the terminal rod members having been press-fitted into the through-hole of the bobbin of the lower stator are inserted into the through-hole of the bobbin of the upper stator;

(g) press-fitting the upper and the lower stator having been axially stacked together onto a central axial sleeve portion of a casing of the stepping motor; and (h) press-fitting a central hole of a top plate portion of a rotor yoke onto a rotating shaft which is rotatably mounted in the central axial sleeve portion of the casing.

DESCRIPTION OF THE PREFERRED EMBODIMENTS

Hereinbelow, the present invention will be described in detail with reference to the accompanying drawings.

Figure 1:
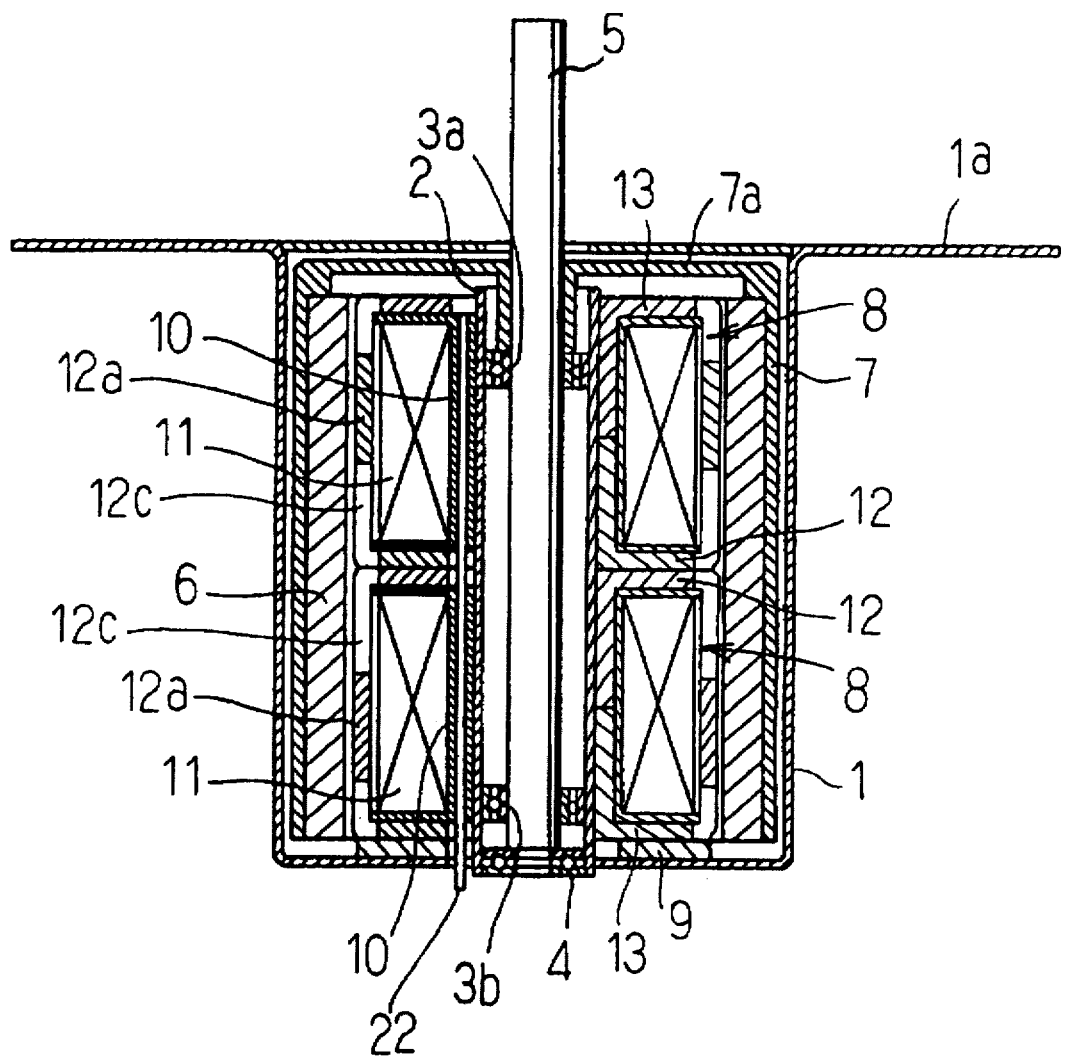
FIG. 1 is a longitudinal sectional view of an embodiment of the stepping motor of the present invention.

FIGS. 1 to 10 show a first embodiment of a stepping motor of the present invention. As shown in FIG. 1, a casing 1 of the stepping motor of the present invention is provided with an outer flange 1a in its upper outer peripheral portion. A sleeve member 2 having its opposite ends opened is fixedly mounted on a central portion of the bottom of the casing 1 to extend in a longitudinal direction of the casing 1. A rotating shaft 5 of the steeping motor of the present invention is rotatably mounted in the sleeve member 2 through a pair of bearings 3a, 3b.

A rotor yoke 7, which assumes a sleeve-like shape having its bottom opened, is provided with a top plate portion 7a with a central axial hole through which the rotor yoke 7 is fixedly mounted on the rotating shaft 5 so as to rotate together with the rotating shaft 5. A permanent magnet 6 is fixedly mounted in an inner peripheral surface of the rotor yoke 7.

An upper and a lower stator 8 are fixedly mounted on an outer peripheral surface of the sleeve member 2. A spacer 9 is mounted between the an upper surface of the bottom of the lower stator 8 and an inner surface of the bottom of the casing 1.

Figure 2:
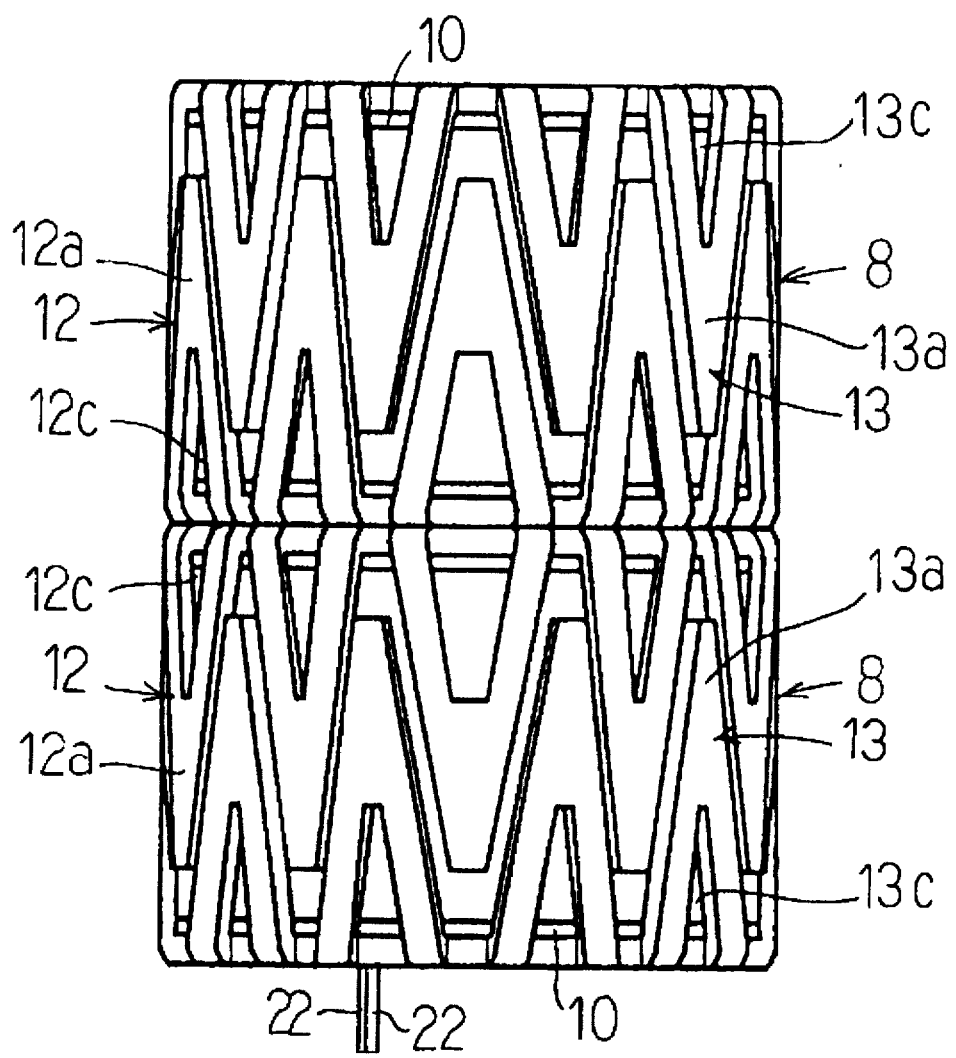
FIG. 2 is a side view of the stators of the stepping motor of the present invention shown in FIG. 1.

As is clear from FIG. 2, the lower stator 8 has the same construction as that of the upper stator 8. In assembly, the upper and the lower stator 8 are symmetrically arranged about a plane passing therebetween, and, therefore have their pole teeth also symmetrically arranged about such plane.

As shown in FIG. 2, the upper and the lower stator 8 are vertically stacked together to form an assembly thereof. In such assembly, a copper wire coated with an insulating material such as polyurethane is wound on a bobbin 10 to form a stator coil 11 which is sandwiched between: an inner stator yoke 12 having its pole tooth 12a extended axially outward; and, an outer stator yoke 13 having its pole tooth 13a extended axially inwardly.

The stepping motor of the present invention is characterized by a novel construction of the bobbin 10 of the stator coil 11.

Figure 3:
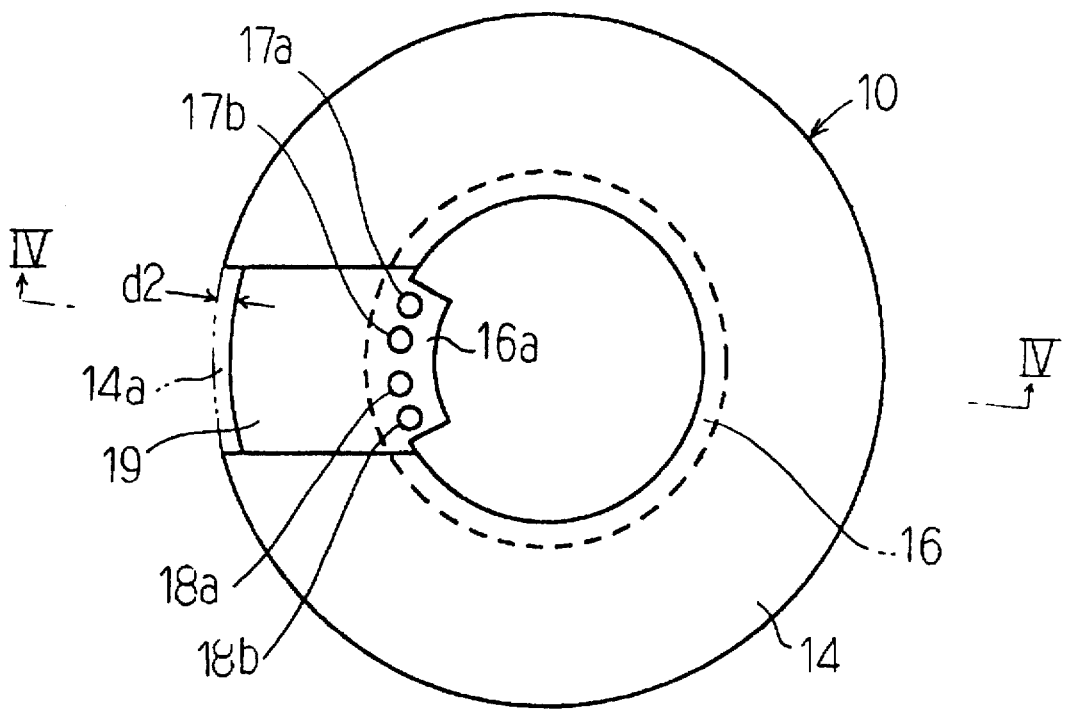
FIG. 3 is a plan view of a bobbin of the stepping motor of the present invention shown in FIG. 1.
Figure 4:
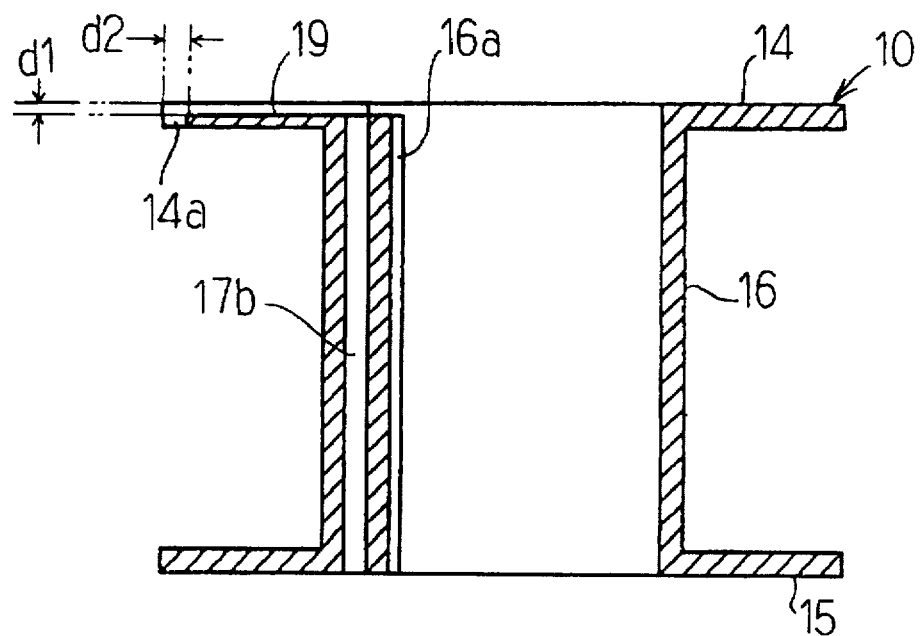
FIG. 4 is a longitudinal sectional view of the bobbin, taken along the line IV—IV of FIG. 3.

As shown in FIGS. 3 and 4, the bobbin 10 is provided with a sleeve portion 16 which is provided with a pair of outer flanges 14, 15 in its axially opposite opened ends together with an axial ridge portion 16a provided in an inner peripheral surface of the sleeve portion 16. The ridge portion 16a extends in a longitudinal direction of the sleeve portion 16 of the bobbin 10.

Formed in the ridge portion 16a of the bobbin 10 are a plurality of through-holes 17a, 17b, 18a, 18b which extend along the length of the ridge portion 16a and receive a plurality of terminal rod members 20, 22 therein. Of the terminal rod members 20, 22, ones 20 are press-fitted in the through-holes 17a, 17b, while the others 22 are loosely received in the through-holes 18a, 18b. As shown in FIG. 3, these through-holes 17a, 17b, 18a, 18b are at the same radius of the center of the bobbin and are spaced apart from each other at equal angular intervals.

Incidentally, in the ridge portion 16a of the bobbin 10, the through-holes 17a, 17b, in which the terminal rod members 20 are press-fitted, are slightly smaller in diameter than the remaining through-holes 18a, 18b which loosely receive the terminal rod members 18a, 18b therein.

As shown in FIG. 4, a guide groove 19 with an axial depth of d1 is formed in an upper surface of the upper flange 14 of the bobbin 10 to radially extend and is provided with a radially-recessed portion 14a in its outermost portion so that the radially outermost end of the bottom of the guide groove 19 is radially recessed from an outer peripheral edge (shown in phantom line of FIG. 3) of the bobbin 10 by the amount of a radial depth of d2 (shown in FIG. 3). The guide groove 19 of the bobbin 10 is for the lead wires 21 extending from the coil 11 mounted on the bobbin 10. In the bobbin 10, each of its axial depth of d1 and the radial depth of d2 of the radially-recessed portion 14a thereof is substantially equal to or slightly larger than a diameter of the lead wire 21.

Figure 5:
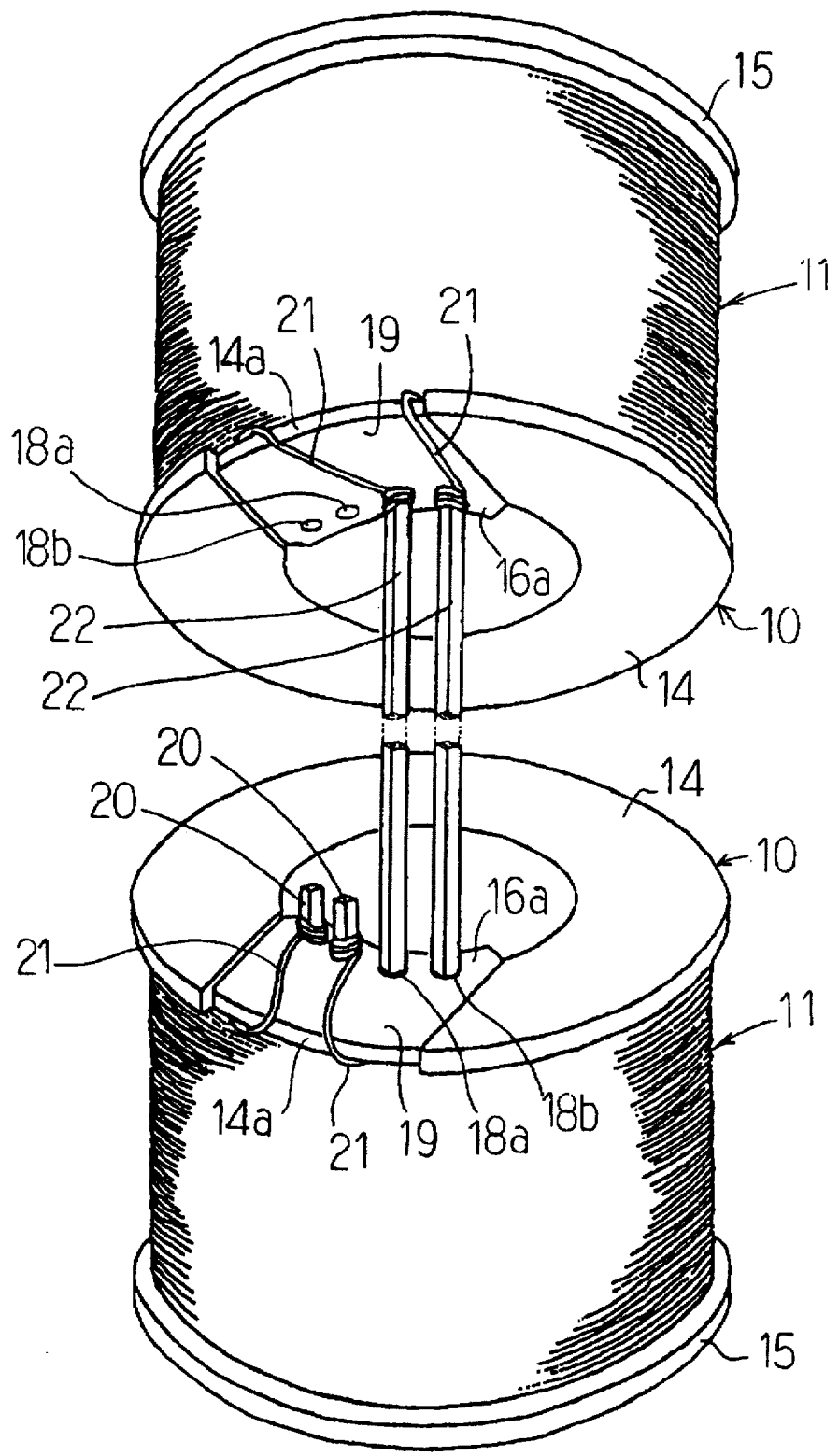
FIG. 5 is a perspective view of an upper and a lower one of the stators of the stepping motor of the present invention shown in FIG. 1, in which stator yokes are removed.
Figure 6:
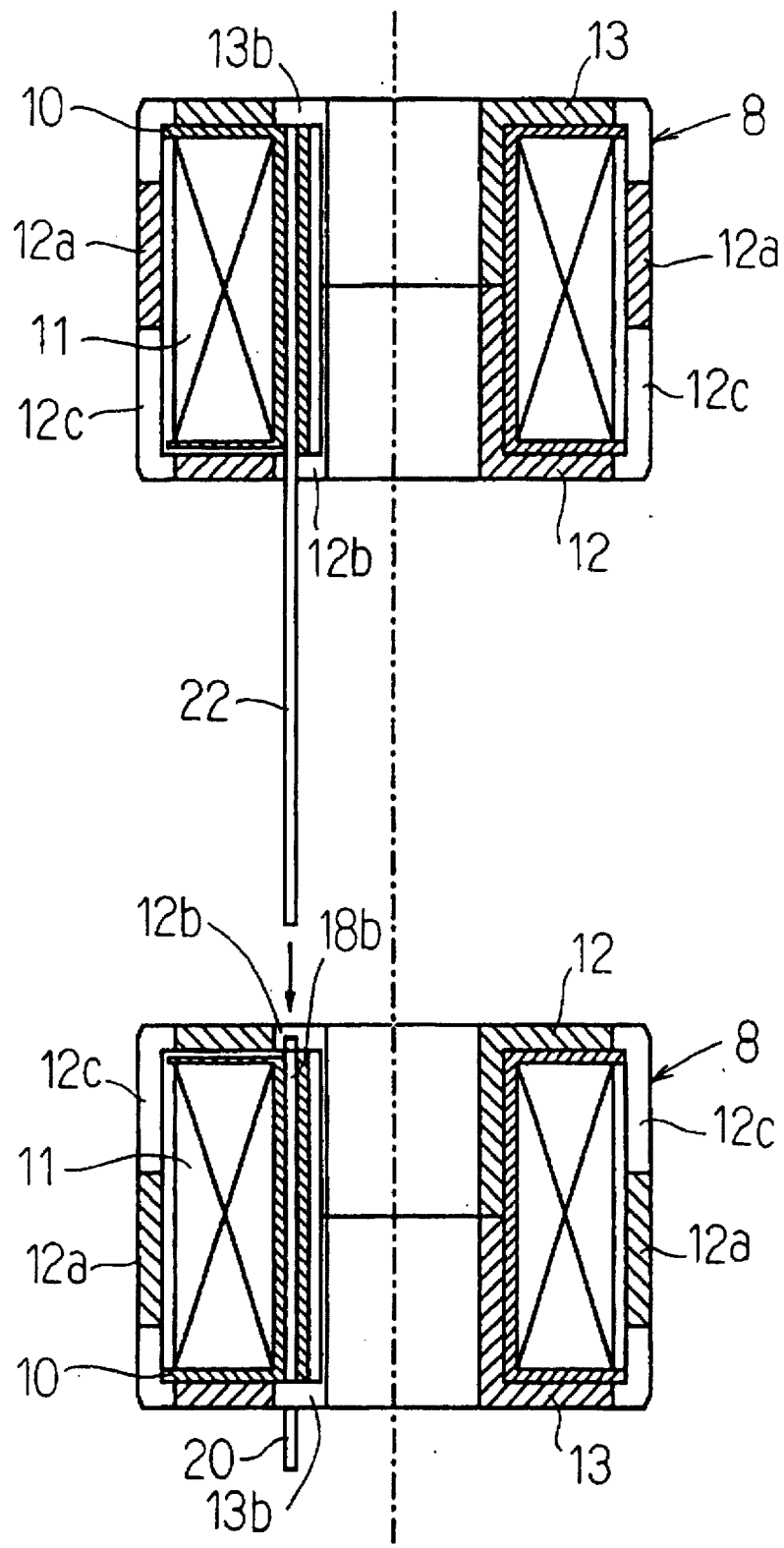
FIG. 6 is a longitudinal sectional view of the upper and the lower stator of the stepping motor of the present invention shown in FIG. 1 in assembly.
Figure 7:
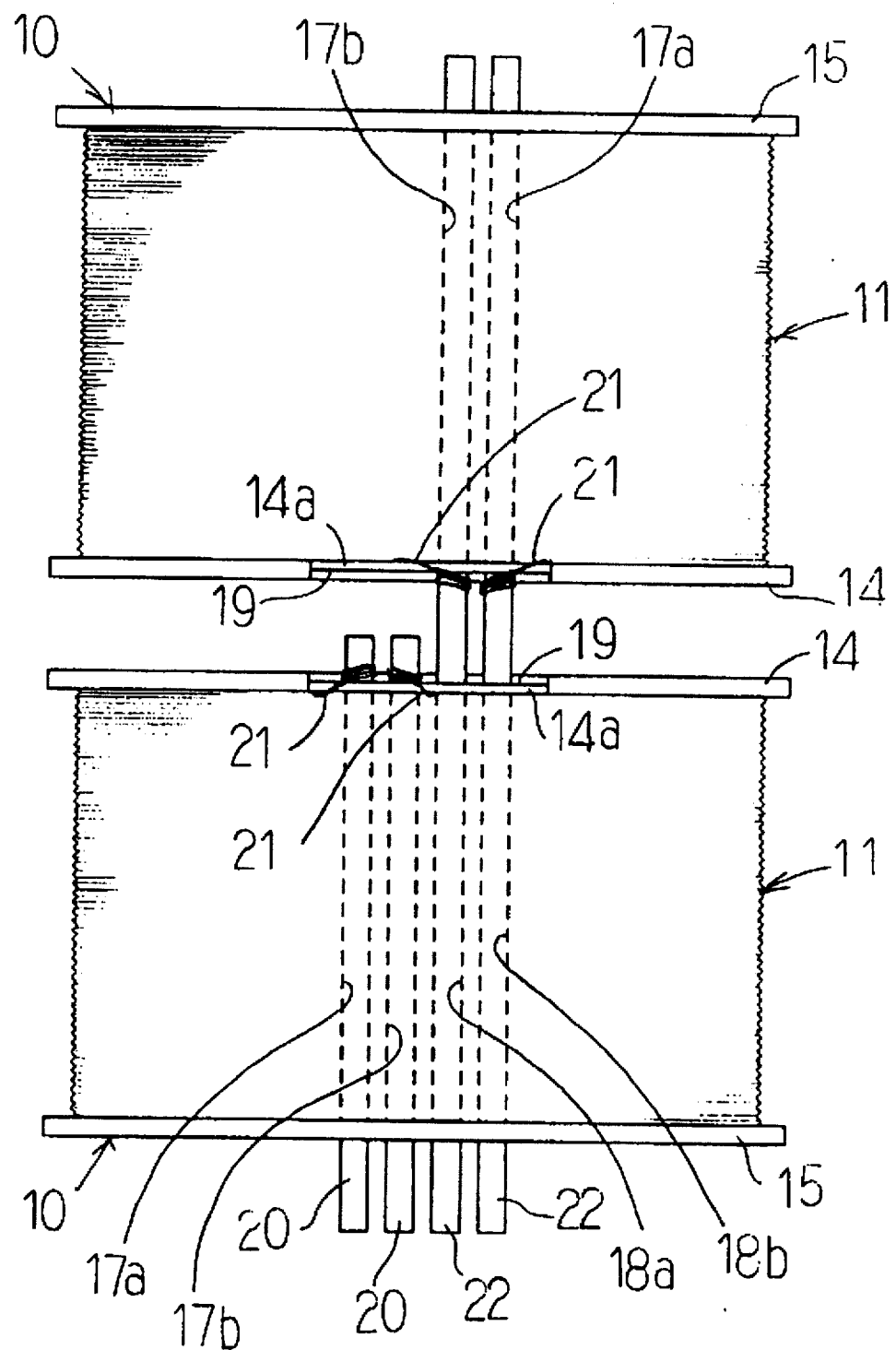
FIG. 7 is a side view of the upper and the lower stator of the stepping motor of the present invention shown in FIG. 1 after the stators are stacked together in assembly, provided that the stator yokes are removed.

As shown in FIG. 5, the coil 11 is fixedly mounted on the bobbin 10 having the above construction. In the lower stator 8, a pair of electrically conductive rods serving as a pair of power feeding terminal rod members 20 are press-fitted in the through-holes 17a, 17b of the lower bobbin 10. The terminal rod member 20 is slightly longer than a height of the bobbin 10. The lead wires 21 extending from the lower coil 10 are passed through the guide groove 19 of the upper flange 14 of the lower bobbin 10 and wound on the corresponding terminal rod members 20 and securely connected therewith by soldering.

Incidentally, in the upper stator 8, another pair of terminal rod members 22 constructed of electrically conductive rods are press-fitted in the through-holes 17a, 17b of the upper bobbin 10. The lead wires 21 extending from the upper coil 10 are passed through the guide groove 19 of the lower flange 14 of the upper bobbin 10 and wound on the corresponding terminal rod members 22 and securely connected therewith by soldering. As is clear from FIG. 7, the terminal rod member 22 of the upper stator 8 is longer than the terminal rod member 20 of the lower stator 8 by the amount of at least a height of the stator 8.

As is clear from an upper or a lower half of FIG. 2, the thus prepared coil assembly having the above construction is axially sandwiched between an outer stator yoke 13 and an inner stator yoke 12 to form the stator 8.

Figure 8:
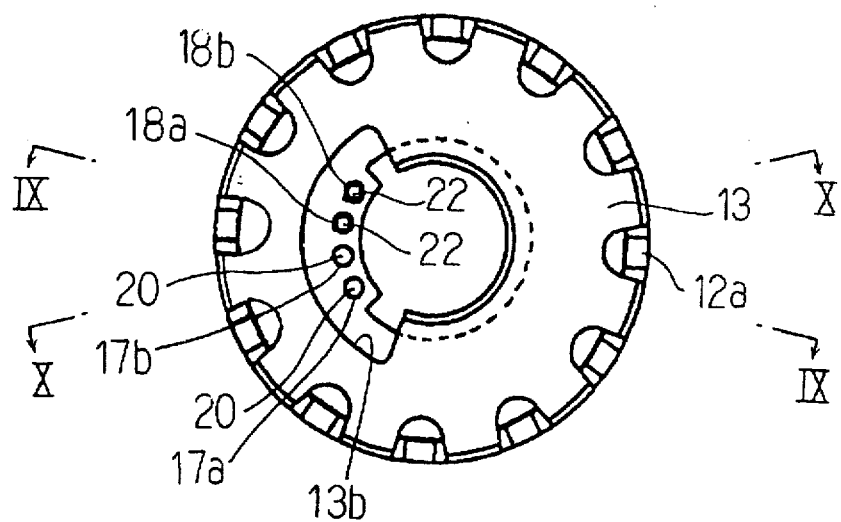
FIG. 8 is a bottom view of the stators of FIG. 7 thus stacked together.
Figure 9:
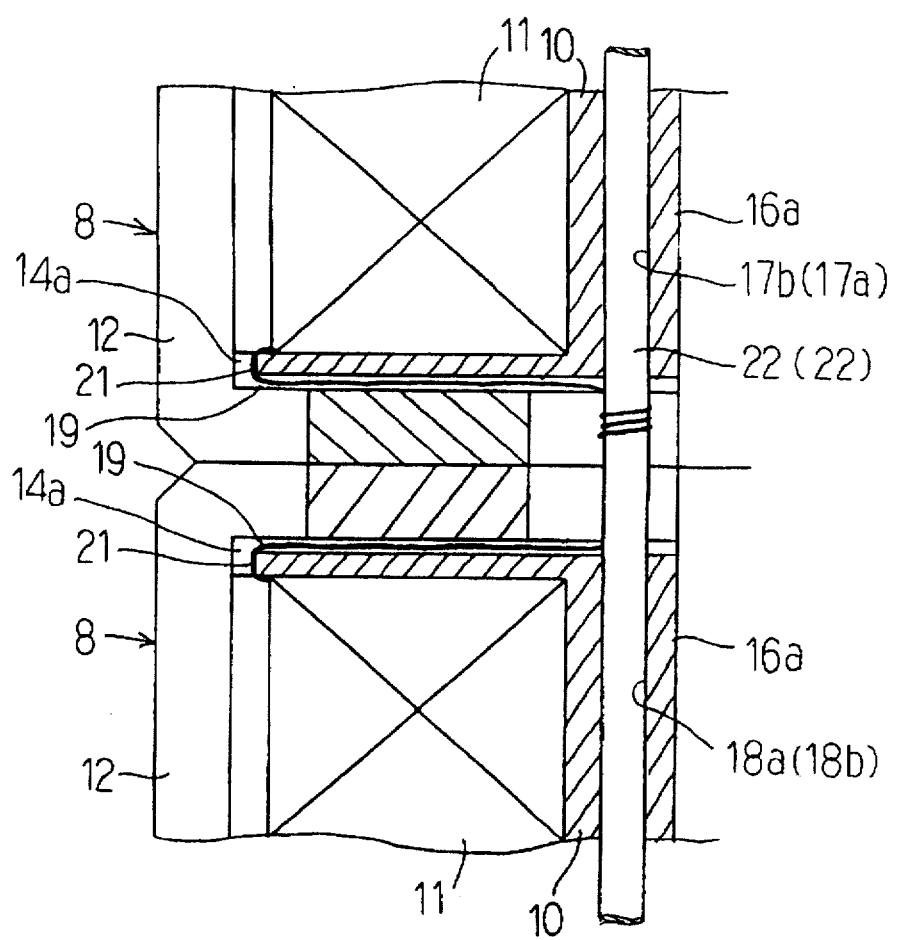
FIG. 9 is a partial longitudinal sectional view of the stepping motor of the present invention, taken along the line IX—IX of FIG. 8.
Figure 10:
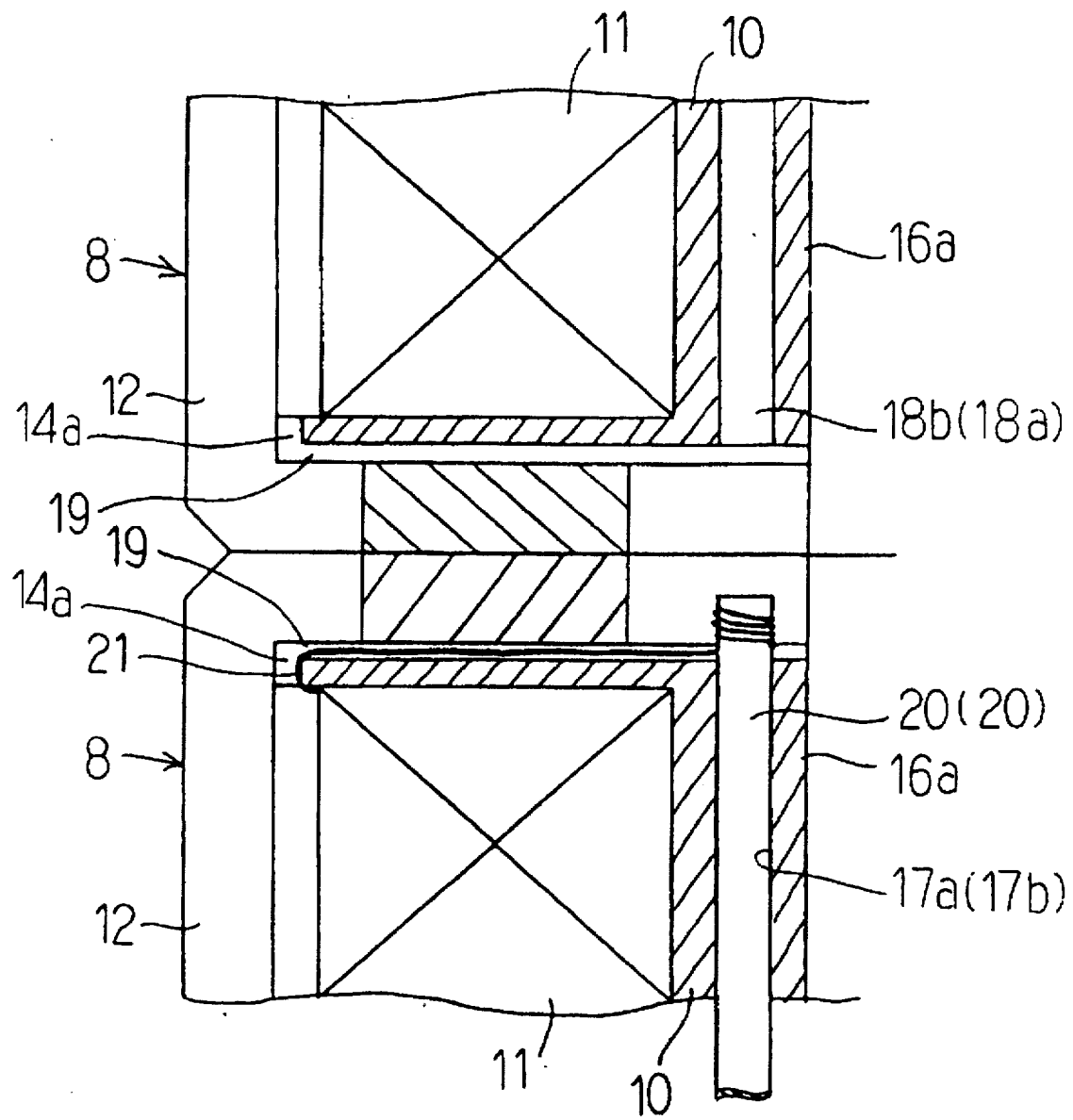
FIG. 10 is a partial longitudinal sectional view of the stepping motor of the present invention, taken along the line X—X of FIG. 8.

As shown in FIG. 8, the outer stator yoke 13 is provided with an notch aperture 13b in its base portion to permit the sleeve member 2, terminal rod members 20 and 22, and the rotating shaft 5 to pass through the base portion of the outer stator yoke 13. The inner stator yoke 12 has the same construction as that of the outer stator yoke 13, and, therefore is provided with the corresponding notch aperture 12b to permit these components 2, 20, 22 and 5 to pass through the base portion of the inner stator yoke 12. Incidentally, each of the numerals 12c and 13c designates the hole of the stator yoke 13, 13.

The stepping motor of the present invention is substantially assembled from a pair of the thus prepared upper and the lower stator 8 as follows:

(a) A conductive wire is wound on an outer peripheral surface of the sleeve portion 16 of each of the upper and the lower bobbin 10. The terminal rod members 20 are press-fitted in the through-holes 17a, 17b of the lower bobbin 10. The terminal rod member 20 is slightly longer than a height of the stator 8. On the other hand, the terminal rod members 22 are press-fitted in the through-holes 17a, 17b of the upper bobbin 10. The terminal rod member 22 is slightly longer than a height of an assembly of the upper and the lower stator 8, in which assembly the upper and the lower stator 8 are axially stacked together, as shown in FIG. 2.

(b) The lead wires 21 extending from the coil 11 of the upper stator 8 are passed through the radially-recessed portion 14a of the guide groove 19 and the remaining portion of the guide groove 19 of the lower flange of the bobbin 10 of the upper stator 8, and connected with the terminal rod members 22.

In the same manner, the lead wires 21 extending from the coil 11 of the lower stator 8 are passed through the radially-recessed portion 14a of the guide groove 19 and the remaining portion of the guide groove 19 of the upper flange of the bobbin 10 of the lower stator 8, and connected with the terminal rod members 20.

(c) The thus prepared coil assembly is sandwiched between the outer stator yoke 13 and the inner stator yoke 12 to form the stator 8. At this time, in the lower stator 8, the terminal rod members 20 have their lower ends extended outward from a lower surface of the stator 8 to form a pair of power feeding terminal members.

(d) In assembly or stacking operation of the stators 8, the lower stator 8 has the guide groove 19 of its bobbin 10 disposed in its uppermost position, while the upper stator 8 has the guide groove 19 of its bobbin 10 disposed in its lowermost position.

At this time, the terminal rod members 22 press-fitted in the the bobbin 10 of the upper stator 8 are loosely inserted into the through-holes 18a, 18b of the bobbin 10 of the lower stator 8 and extended outward from the lower surface of the lower stator 8 to form a pair of power feeding terminal members for the upper stator 8.

(e) The terminal rod members 20, 22 of the upper and the lower stator 8 are permitted to extend outward from the lower surface of the lower stator 8 and fixedly mounted on an outer peripheral surface of the sleeve member 2 of the casing 1 in an insertion manner.

(f) The rotating shaft 5 of the stepping motor of the present invention is rotatably supported by the sleeve member 2 and fixedly mounted in the central hole of the top plate portion 7a of the rotor yoke 7.

The stepping motor of the present invention is assembled in a manner described above. The upper and the lower stator 8 has the same construction, provided that the terminal rod members 20, 22 thereof are different in length. Further, the upper and the lower stator 8 are the same in winding direction of the coil, which makes it possible to use the stator 8 as an interchangeable standard part.

Consequently, in the production of the stepping motor of the present invention, it is possible to assemble an interchangeable standard stator 8 by press-fitting the terminal rod members (20, 22) with the same length in the bobbins 10. Namely, in the stacking operation of the upper and the lower stator 8, an upper portion of each of the terminal rod members (20) of the lower stator 8 is cut off at a position above its connection with the lead wire 21 extending from the coil 11 to permit the upper and the lower stator 8 are axially stacked together.

Figure 11:
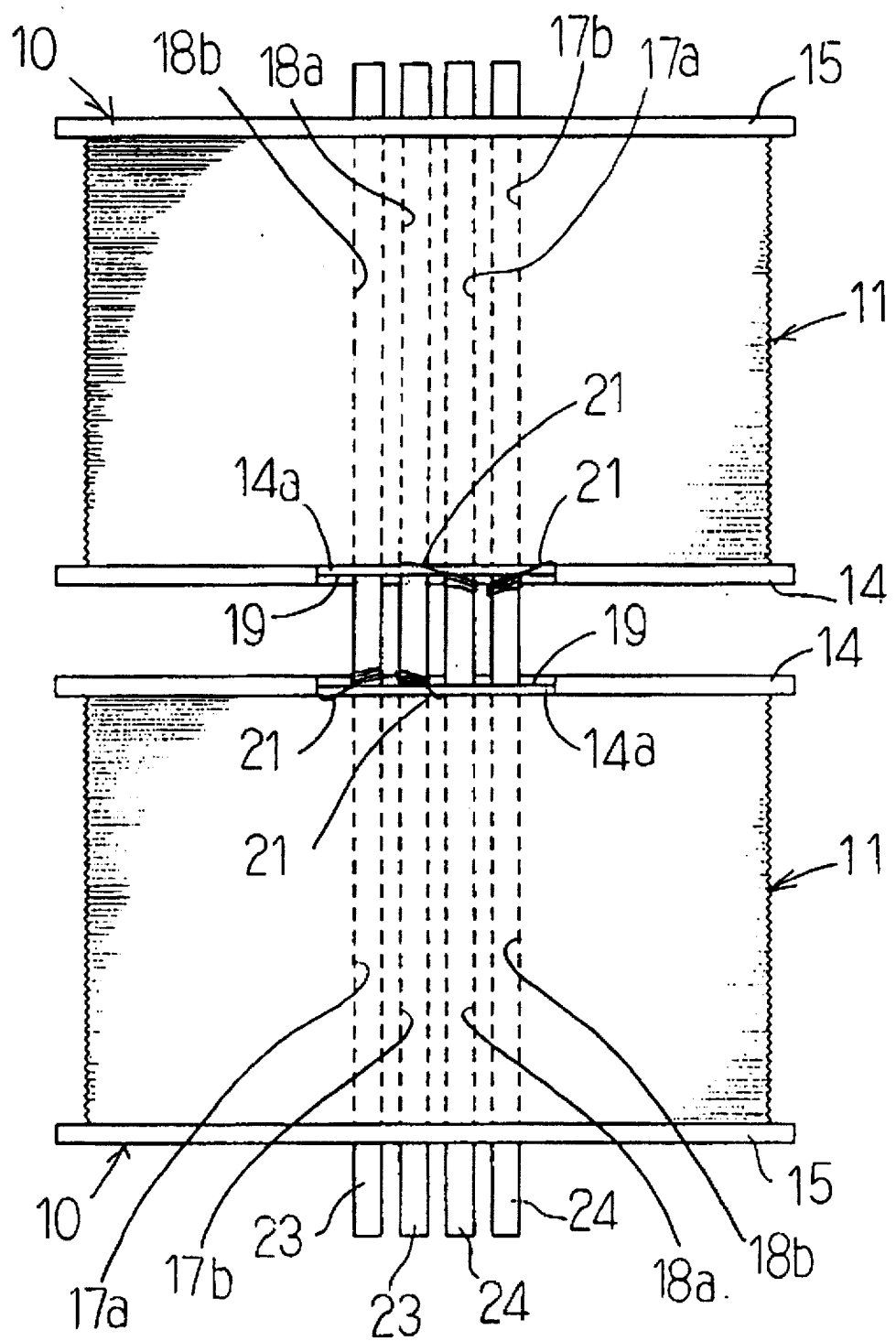
FIG. 11 is a side view of an upper and a lower stator of another embodiment of the stepping motor of the present invention, provided that stator yokes thereof are removed.

FIG. 11 shows a second embodiment of the stepping motor of the present invention, in which all the terminal rod members 23, 24 are the same in length and pass through both the upper and the lower stator 8.

In such second embodiment of the present invention, each of the terminal rod members 23 press-fitted in the bobbin 10 of the lower stator 8 has the same length as that of each of the terminal rod members 24 press-fitted in the bobbin 10 of the upper stator 8. In other words, each of the terminal rod members 23, 24 is slightly longer than the total height of the upper and the lower stator 8 thus stacked together. The terminal rod members 23 of the lower stator 8 are loosely inserted into the through-holes 18a, 18b of the bobbin 10 of the upper stator 8, while the terminal rod members 24 of the upper stator 8 are loosely inserted into the through-holes 18a, 18b of the bobbin 10 of the lower stator 8. The assembling operation of the upper and the lower stator 8 is conducted as follows:

(a) The terminal rod members 23 and 24, each of which is slight longer than the total height of the upper and the lower stator 8 having been stacked together, are press-fitted in the through-holes 17a, 17b of the bobbin 10 of the upper stator 8 and those 17a, 17b of the bobbin 10 of the lower stator 8, respectively.

(b) The lead wires 21 extending from the coil 11 of the upper stator 8 are passed through the radially-recessed portion 14a of the guide groove 19 and the remaining portion of the guide groove 19 of the lower flange 14 of the bobbin 10 of the upper stator 8, and connected with the terminal rod members 24.

In the same manner, the lead wires 21 extending from the coil 11 of the lower stator 8 are passed through the radially-recessed portion 14a of the guide groove 19 and the remaining portion of the guide groove 19 of the upper flange 14 of the bobbin 10 of the lower stator 8, and connected with the terminal rod members 23.

(c) The thus prepared coil assembly is sandwiched between an outer stator yoke 13 and the inner stator yoke 12 to form the stator 8.

At this time, the terminal rod members 23 of the lower stator 8 have their lower end portions extended outward from a lower surface the lower stator 8 to form a pair of power feeding terminal members.

(d) In assembly, the upper and the lower stator 8 are axially stacked together in a condition in which the lower stator 8 has the guide groove 19 of its bobbin 10 disposed in the uppermost position of the lower stator 8 while the upper stator 8 has the guide groove 19 of its bobbin 10 disposed in the lowermost position of the upper stator 8.

At this time, upper end portions of the terminal rod members 23 press-fitted in the bobbin 10 of the lower stator 8 are loosely inserted into the through-holes 18a, 18b of the bobbin 10 of the upper stator 8, while lower end portions of the terminal rod members 24 press-fitted in the bobbin 10 of the upper stator 8 are loosely inserted into the through-holes 18a, 18b of the bobbin 10 of the lower stator 8 and extended outward from a lower surface of the lower stator 8 to form a pair of power feeding terminal members for the upper stator 8.

In the same manner as is in the first embodiment of the present invention, the terminal rod members 23, 24 of the assembly of the upper and the lower stator 8 in the second embodiment of the present invention are permitted to extend outward from the lower surface of the lower stator 8 and fixedly mounted on an outer peripheral surface of the sleeve member 2 of the casing 1 in an insertion manner. The rotating shaft 5 of the stepping motor of the present invention is rotatably supported by the sleeve member 2 and fixedly mounted in the central hole of the top plate portion 7a of the rotor yoke 7.

In the embodiments of the present invention, though the power feeding members connected with the coils 10 of the upper and the lower stator 8 are constructed of electrically-conductive terminal rod members 20, 22, 23 and 24, it is also possible to use electrically-conductive wire means in place of these terminal rod members. The wire means may be constructed of lead wires which extend from the coils 11, pass through the through-holes 17a, 17b, 18a, 18b of the bobbins 10 and connected with the corresponding terminal members provided outside the casing 1 of the stepping motor of the present invention.

The steeping motor of the present invention has the following effects:

Since the lead wires 21 extending from the coil 10 extend radially inwardly toward a center of the stepping motor through the guide groove 19 of the bobbin 10 and are connected with the terminal rod members which pass through the through-holes of the bobbin to extend outward from the lower surface of the casing 1, a fixing operation of the lead wires 21 may be eliminated in the assembling operation of the stators 8, which facilitates the assembling operation and reduces the number of process steps in production of the stepping motor of the present invention.

Further, in the stepping motor of the present invention, since the lead wires 21 extending from the coil 11 extend in a direction opposite to the pole tooth of the stator 8, i.e., extend toward the rotating shaft 5, there is no need of reducing the number of the pole tooth of the stator 8.

Consequently, it is possible for the stepping motor the present invention to have its rotating shaft 5 precisely stepped with a small stepping angle from one angular position to a subsequent one. Further, as is clear from the above description, it is possible to produce the stepping motor the present invention at a low cost in a easy manner.

What is claimed is:

1. In an outer rotor type stepping motor comprising, in combination:

(a) a rotating shaft (5) rotatably mounted in a casing (1);

(b) a rotor yoke (7) having a sleeve-like shape including a top portion closed by a top-plate portion (7a) and an open bottom portion, said top-plate portion (7a) of said rotor yoke (7) having a center hole in which said rotating shaft (5) is fixedly mounted, said rotor yoke (7) being provided with a permanent magnet (6) in its inner peripheral surface;

(c) an upper stator (8) and lower stator (8) each of which is constructed of a coil (11) and a stator yoke (12, 13), and fixedly mounted in said casing (1) to surround said rotating shaft (5), said coil (11) having its conductor wound on respective upper and lower bobbins (10, 10) each having a sleeve-like shape including opened upper and lower end portions, each said bobbin (10) being provided with an outer flange (14, 15) in its opposite opened-end portions, said stator yoke (12, 13) surrounding said coil (11);

the improvement wherein:

(d) each of said upper and lower bobbins (10, 10) is provided with an axial ridge portion (16a) in an inner peripheral surface thereof, each ridge portion (16a) extending in a longitudinal direction of the respective bobbin (10) thereof and being having at least one through-hole (17a, 17b, 18a, 18b) extending in parallel with said ridge portion (16a), said through-hole of said upper bobbin (10) being aligned with a corresponding through-hole of said lower bobbin (10); and (e) a plurality of power feeding members (20, 20, 22, 22) pass through said through-hole of said upper and said lower bobbin (10, 10) and are connected with a plurality of lead wires (21, 21) which extend outward from said coils (11, 11), said power feeding members (20, 20, 22, 22) having their end portions extended outward from said casing (1) to form a plurality of power feeding terminals.

2. In a stepping motor comprising, in combination:

(a) a rotating shaft rotatably mounted in a casing;

(b) a rotor yoke assuming a sleeve-like shape having its top portion closed with a top-plate portion and its bottom portion opened, said top-plate portion of said rotor yoke being provided with a center hole in which said rotating shaft is fixedly mounted, said rotor yoke being provided with a permanent magnet in its inner peripheral surface;

(c) an upper and lower stator each of which is constructed of a coil and a stator yoke, and fixedly mounted in said casing to surround said rotating shaft, said coil having its conductor wound on a bobbin which assumes sleeve-like shape and having its upper and lower end portions opened, said bobbin being provided with an outer flange in its opposite opened-end portions, said stator yoke surrounding said coil;

the improvement wherein:

(d) said bobbin is provided with an axial ridge portion in its inner peripheral surface, said ridge portion extending in a longitudinal direction of said bobbin and being provided with a through-hole extending in parallel with said ridge portion; and (e) a plurality of power feeding members pass through said through-hole of said bobbin and are connected with a plurality of lead wires which extend outward from said coils, said power feeding members having their end portions extended outward from said casing to form a plurality of power feeding terminals;

wherein:

a guide groove (19) is provided in one of axially adjacent surfaces of adjacent ones of said outer flanges (14, 14) between said upper and said lower bobbin (10, 10), said guide groove extending from said ridge portion (16a) of said bobbin (10) to an outer peripheral edge portion of said outer flange (14) of said bobbin (10), and having a radially-recessed portion (14a) in its outer peripheral portion; and said lead wires (21, 21) extending from said coils (11, 11) are passed through said radially-recessed portion (14a) of said guide groove (19) and the remaining portion of said guide groove, and are connected with said power feeding terminals.

3. In a stepping motor comprising, in combination:

(a) a rotating shaft rotatably mounted in a casing;

(b) a rotor yoke assuming a sleeve-like shape having its top portion closed with a top-plate portion and its bottom portion opened, said top-plate portion of said rotor yoke being provided with a center hole in which said rotating shaft is fixedly mounted, said rotor yoke being provided with a permanent magnet in its inner peripheral surface;

(c) an upper and lower stator each of which is constructed of a coil and a stator yoke, and fixedly mounted in said casing to surround said rotating shaft, said coil having its conductor wound on a bobbin which assumes sleeve-like shape and having its upper and lower end portions opened, said bobbin being provided with an outer flange in its opposite opened-end portions, said stator yoke surrounding said coil;

the improvement wherein:

(d) said bobbin is provided with an axial ridge portion in its inner peripheral surface, said ridge portion extending in a longitudinal direction of said bobbin and being provided with a through-hole extending in parallel with said ridge portion; and (e) a plurality of power feeding members pass through said through-hole of said bobbin and are connected with a plurality of lead wires which extend outward from said coils, said power feeding members having their end portions extended outward from said casing to form a plurality of power feeding terminals;

wherein:

said power feeding members are constructed of electrically conductive rod members.

4. The outer rotor type stepping motor as set forth in claim 1, wherein:

said power feeding members (20, 20, 22, 22) are constructed of electrically conductive wire members.

5. The outer rotor type stepping motor as set forth in claim 1, wherein:

said power feeding members (20, 20, 22, 22) are constructed of electrically conductive rod members.

* * * * *